(12) United States Patent
Sakuma

(10) Patent No.: US 9,983,020 B2
(45) Date of Patent: May 29, 2018

(54) VEHICLE OPERATION DEVICE AND METHOD

(71) Applicant: Nissan Motor Co., Ltd., Yokohama-Shi, Kanagawa (JP)

(72) Inventor: Tsuyoshi Sakuma, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days. days.

(21) Appl. No.: 15/124,226

(22) PCT Filed: Feb. 4, 2015

(86) PCT No.: PCT/JP2015/053063
§ 371 (c)(1),
(2) Date: Sep. 7, 2016

(87) PCT Pub. No.: WO2015/137012
PCT Pub. Date: Sep. 17, 2015

(65) Prior Publication Data
US 2017/0016738 A1    Jan. 19, 2017

(30) Foreign Application Priority Data
Mar. 12, 2014    (JP) .................................. 2014-048570

(51) Int. Cl.
*G01C 21/36* (2006.01)
*G01C 21/34* (2006.01)
(Continued)

(52) U.S. Cl.
CPC ......... *G01C 21/3617* (2013.01); *B60W 30/06* (2013.01); *G01C 21/3415* (2013.01);
(Continued)

(58) Field of Classification Search
CPC ............ G01C 21/3605; G01C 21/3614; G01C 21/3617; G01C 21/3415; B60W 30/06; G05D 1/021; G08G 1/0969
See application file for complete search history.

(56) References Cited

U.S. PATENT DOCUMENTS

2005/0149254 A1    7/2005  Yamada et al.
2009/0105947 A1    4/2009  Nachesa et al.
(Continued)

FOREIGN PATENT DOCUMENTS

| CN | 102407848 A | 4/2012 |
|---|---|---|
| JP | H11102157 A | 4/1999 |

(Continued)

OTHER PUBLICATIONS

Volvo Car USA: "Volvo Cars—Autonomous Parking Concept", Jun. 20, 2013 XP054978061, Retrieved from the Internet: URL: https://www.youtube.com/watch?v=3VL40Uyx2c4 (retrieved on Jan. 26, 2018).

(Continued)

*Primary Examiner* — Russell Frejd
(74) *Attorney, Agent, or Firm* — Young Basile Hanlon & MacFarlane, P.C.

(57) ABSTRACT

A vehicle operation device is used in an autonomous vehicle autonomously controlled to drive along a determined driving route, and includes: a destination setting circuit configured to set a destination to a wide area for determining the driving route; a route setting circuit configured to allot a provisional destination on the boundary of the area of the destination according to route search conditions including a current position and the destination, so as to determine the driving route passing through the provisional destination; and a presenting circuit configured to provide a user with a task indicated by an item operated by the user while the autonomous vehicle is moving along the driving route toward the (Continued)

provisional destination, so that the task is executed in the area of the destination after reaching the provisional destination.

17 Claims, 21 Drawing Sheets

(51) Int. Cl.
*B60W 30/06* (2006.01)
*G05D 1/02* (2006.01)
*G08G 1/0969* (2006.01)

(52) U.S. Cl.
CPC ..... *G01C 21/3605* (2013.01); *G01C 21/3614* (2013.01); *G05D 1/021* (2013.01); *G08G 1/0969* (2013.01)

(56) References Cited

U.S. PATENT DOCUMENTS

| | | | | |
|---|---|---|---|---|
| 2009/0198443 | A1* | 8/2009 | Yamazaki | G01C 21/3605 701/414 |
| 2012/0188100 | A1* | 7/2012 | Min | G08G 1/143 340/932.2 |
| 2013/0052614 | A1* | 2/2013 | Mollicone | G09B 19/167 434/65 |
| 2013/0231824 | A1* | 9/2013 | Wilson | G05D 1/0246 701/26 |
| 2014/0046590 | A1 | 2/2014 | Needham et al. | |
| 2014/0214260 | A1* | 7/2014 | Eckert | B60Q 1/488 701/28 |
| 2014/0379197 | A1* | 12/2014 | Eckert | B60T 7/22 701/28 |
| 2015/0149265 | A1* | 5/2015 | Huntzicker | B60W 30/06 705/13 |
| 2016/0273922 | A1* | 9/2016 | Stefan | G01C 21/3407 |
| 2017/0219364 | A1* | 8/2017 | Lathrop | G01C 21/3438 701/23 |

FOREIGN PATENT DOCUMENTS

| | | |
|---|---|---|
| JP | 2003042787 A | 2/2003 |
| JP | 2009042106 A | 2/2009 |
| JP | 2009533693 A | 9/2009 |
| JP | 2011209027 A | 10/2011 |
| JP | 2013154730 A | 8/2013 |
| WO | 2013100902 A1 | 7/2013 |

OTHER PUBLICATIONS

BotJunkie: "VAIL Autonomous Valet Parking Demo", Oct. 25, 2009 XP054978062, Retrieved from the Internet: URL: https://www.youtube.com/watch?v=YVuG7HAt-r4 (retrieved on Jan. 26, 2018).

* cited by examiner

VEHICLE OPERATION DEVICE AND METHOD

CROSS REFERENCE TO RELATED APPLICATION

The present application claims priority to Japanese Patent Application No. 2014-048570 filed on Mar. 12, 2014, the entire content of which is herein incorporated by reference.

TECHNICAL FIELD

The present invention relates to a vehicle operation device for operating an autonomous vehicle and a method of operation.

BACKGROUND

Navigation devices are widely used for planning routes from starting points to set destinations. For example, a navigation device is known that plans a route without taking an unnecessary detour even when a destination is not exactly determined at the point of departure (refer to Japanese Unexamined Patent Application Publication No. 2011-209027). Such a navigation device searches for a plurality of routes to provisional destinations, and requests a user to narrow down the destinations when approaching a junction of the routes.

The navigation device described in Japanese Unexamined Patent Application Publication No. 2011-209027), however, still requires the user to designate a final destination; otherwise the route guidance cannot be continued.

SUMMARY

In view of the foregoing, an object of the present invention is to provide a vehicle operation device capable of starting autonomous driving before designating a specific destination, and continuing the autonomous driving smoothly until reaching a final destination.

A vehicle operation device is used in an autonomous vehicle autonomously controlled to drive along a determined driving route, and includes a destination setting unit, a route setting unit, and a presenting unit. The destination setting unit sets a destination to a wide area for determining the driving route. The route setting unit allots a provisional destination on a boundary of the area of the destination according to route search conditions including a current position and the destination, so as to determine the driving route passing through the provisional destination. The presenting unit provides a user with a task indicated by an item operated by the user while the autonomous vehicle is moving along the driving route toward the provisional destination, so that the task is executed in the area of the destination after reaching the provisional destination.

DETAILED DESCRIPTION OF THE EMBODIMENTS

Figure 1:
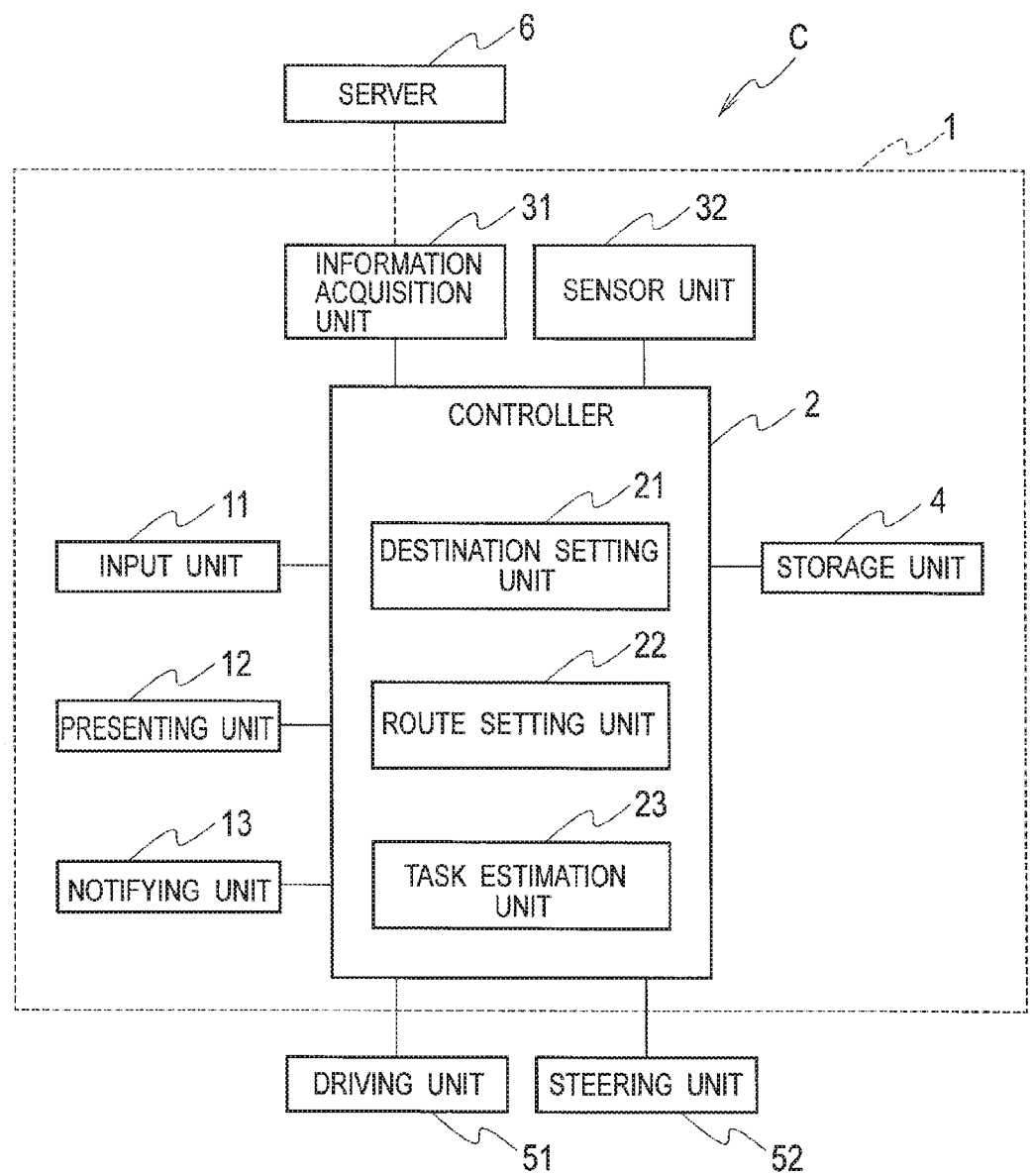
FIG. 1 is a block diagram for describing a fundamental configuration of an autonomous vehicle according to a first embodiment of the present invention.

Hereinafter, the first and second embodiments of the present invention will be described with reference to the drawings. The same or similar elements shown in the drawings are indicated by the same or similar reference numerals, and overlapping descriptions are not repeated.

First Embodiment

As shown in FIG. 1, an autonomous vehicle C according to the embodiment of the present invention includes a driving unit 51 for accelerating and decelerating the autonomous vehicle C, a steering unit 52 for steering the autonomous vehicle C, and a vehicle operation device 1 for controlling the driving unit 51 and the steering unit 52 to drive the autonomous vehicle C. The autonomous vehicle C is autonomously controlled to drive along a driving route determined by the vehicle operation device 1.

The vehicle operation unit 1 includes an input unit 11 that inputs, to the autonomous vehicle C, a signal corresponding to the operation performed by the user of the autonomous vehicle C, a presenting unit 12 that provides the user with information, a notifying unit 13 that notifies the user of information, and a controller 2 that controls the respective components included in the autonomous vehicle C. The vehicle operation device 1 further includes an information acquisition unit 31 that acquires information about autonomous driving, a sensor unit 32 that detects surrounding information of the autonomous vehicle C, and a storage unit 4 that stores data necessary for processing executed by the controller 2.

The input unit 11 includes an input device that receives the operation performed by the user and further inputs a signal corresponding to the operation to the controller 2. The presenting unit 12 includes a display device having a screen on which images and characters provided for the user are displayed, and an output device for reproducing voices such as a speaker. The presenting unit 12 indicates tasks implemented by the autonomous vehicle C as items selected by the user. A touch panel display serves as both the input unit 11 and the presenting unit 12, for example. The notifying unit 13 includes an output device for reproducing voices such as a speaker. The notifying unit 13 may be the same hardware element as the presenting unit 12.

The controller 2 includes a destination setting unit 21 that sets a destination for determining a driving route along which the autonomous vehicle C drives, a route setting unit 22 that determines the driving route based on the destination, and a task estimation unit 23 that estimates tasks suggested to the user. The controller 2 is, for example, a computer including a central processing unit (CPU) to implement calculation processing necessary for the driving of the autonomous vehicle C. The controller 2, the destination setting unit 21, the route setting unit 22, and the task estimation unit 23 are indicated by elements having logical structures, and may be provided as independent hardware elements or may be provided as an integrated hardware element. The controller 2 controls the autonomous vehicle C to drive along the driving route safely and regally, according to the information from the information acquisition unit 31, the sensor unit 32, and the storage unit 4.

The destination setting unit 21 sets the destination to a wide area for determining the driving route based on the signal output from the input unit 11 and corresponding to the user's operation. The route setting unit 22 allots a provisional destination on the boundary of the destination area based on route search conditions including the destination set by the destination setting unit 21 and a current position, and searches for and determines the driving route passing through the provisional destination. The route search conditions may further include traffic information and traffic laws and regulations with regard to the driving route and the periphery thereof, time zones, a classification of road, and priority matters on determining the route.

The task estimation unit 23 obtains task information from at least one of the storage unit 4 and the information acquisition unit 31, so as to estimate tasks suggested to the user based on the task information. The task estimation unit 23 provides the user with the estimated tasks through the presenting unit 12. The task estimation unit 23 obtains, from the storage unit 4 or the information acquisition unit 31, the task information including a history of tasks having been selected by the user, estimated time zones in which tasks are executed, a history of driving toward destinations, and information of facilities in destination areas. The term "tasks" as used herein is to reach optional places, which may be narrowed down depending on activities of the user, such as taking meals, going to recreational facilities, and going shopping.

The information acquisition unit 31 acquires information externally via wireless communication and inputs the information into the controller 2. The information acquisition unit 31 acquires a current position of the autonomous vehicle C according to a positioning system such as a global positioning system (GPS). The information acquisition unit 31 also acquires user information via a network from an external server 6 that holds the information of the user including at least one of registration information of the user with regard to the autonomous vehicle C, a submission history, and an activity history. The information acquisition unit 31 may acquire traffic information such as traffic restrictions or traffic congestion, and map data from the server 6.

The sensor unit 32 includes sensors such as a camera, a distance measuring device, and a speedometer. The sensors, when using electromagnetic waves, can detect various frequency bands, such as radio waves, infrared light, and visible light. The sensor unit 32 detects surrounding information of the autonomous vehicle C, including other vehicles, obstacles, alignments of driving routes, widths of roads, signposts, road signs, lane boundaries, and road conditions, and inputs the information into the controller 2.

The storage unit 4 includes a storage device such as a magnetic disk or a semiconductor memory. The storage unit 4 stores various kinds of data including programs necessary for processing implemented by the controller 2, map data, and traffic laws and regulations. The storage unit 4 may also serve as a transitory storage medium for processing implemented by the controller 2.

Operation of Vehicle Operation Device

Figure 2:
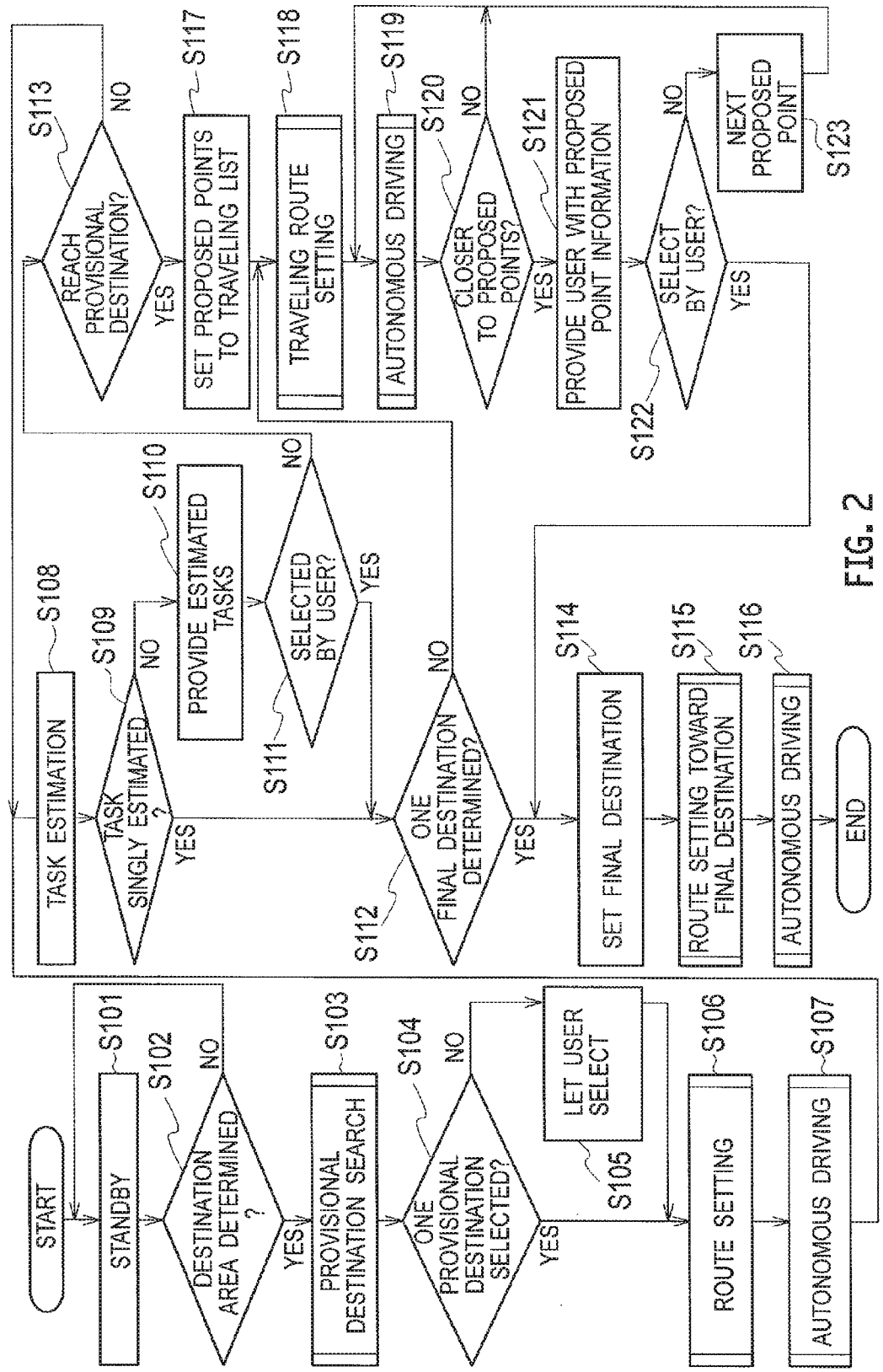
FIG. 2 is a flowchart for describing the operation of a vehicle operation device included in the autonomous vehicle according to the first embodiment of the present invention.

An example of the operation of the vehicle operation device 1 included in the autonomous vehicle C according to the first embodiment is described below with reference to the flowchart shown in FIG. 2.

First, in step S101, the controller 2 is on standby for an input of a signal from the input unit 11 corresponding to an operation by the user. When the signal corresponding to the operation by the user is input from the input unit 11, the destination setting unit 21 determines in step S102 whether a destination area is designated.

Figure 3:
FIG. 3 is an example view showing an input unit and a presenting unit, for describing the operation of the vehicle operation device included in the autonomous vehicle according to the first embodiment of the present invention.
Figure 4:
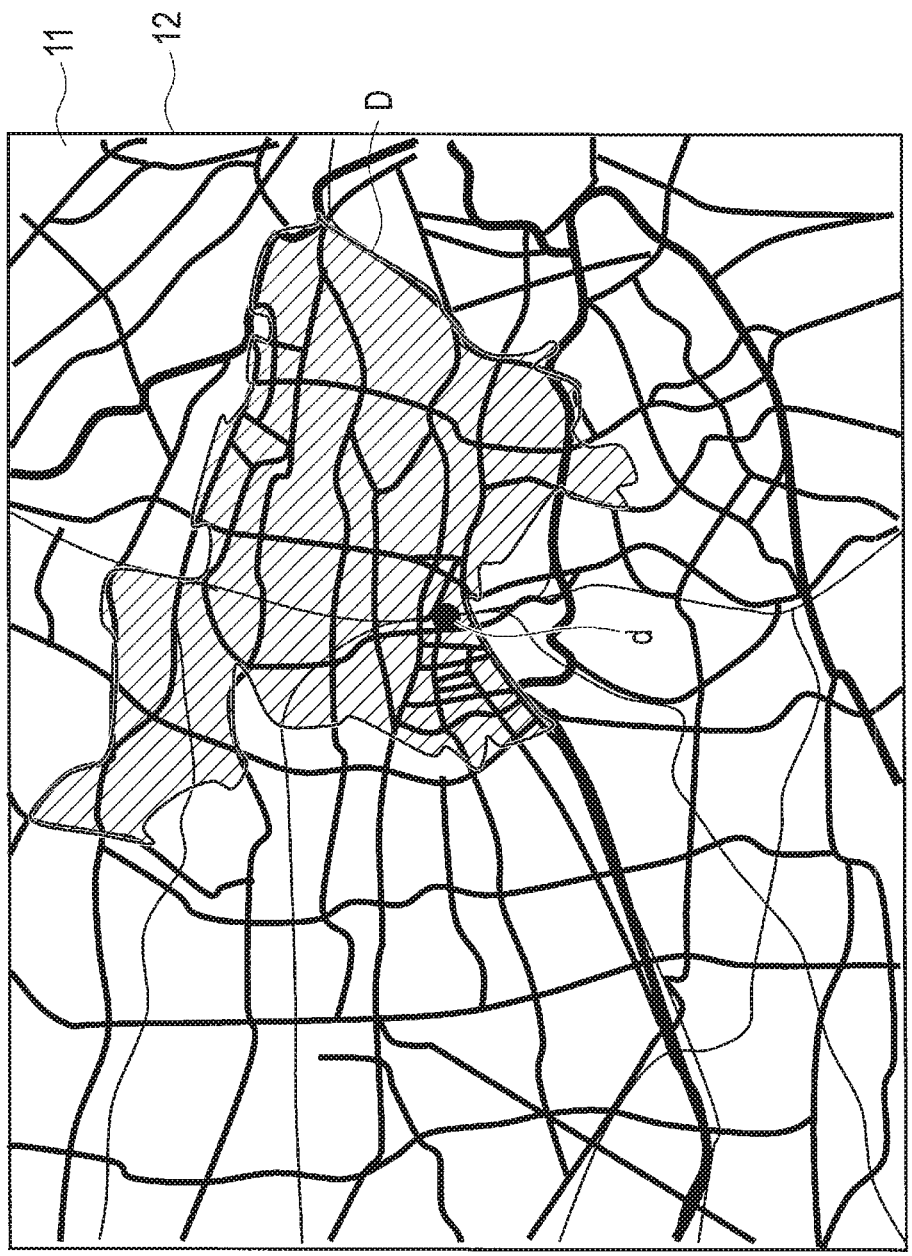
FIG. 4 is an example view showing the input unit and the presenting unit, for describing the operation of the vehicle operation device included in the autonomous vehicle according to the first embodiment of the present invention.
Figure 5:
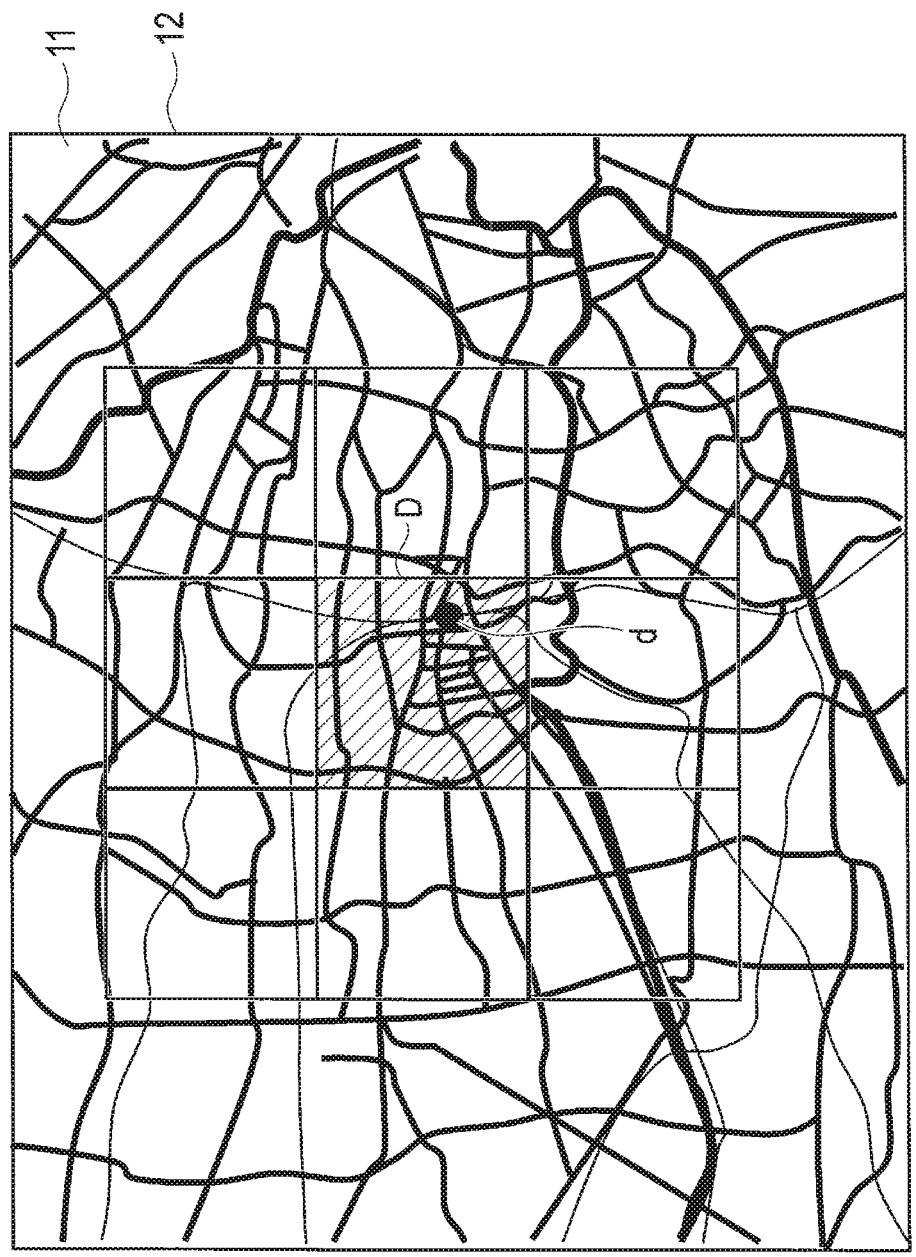
FIG. 5 is an example view showing the input unit and the presenting unit, for describing the operation of the vehicle operation device included in the autonomous vehicle according to the first embodiment of the present invention.
Figure 6:
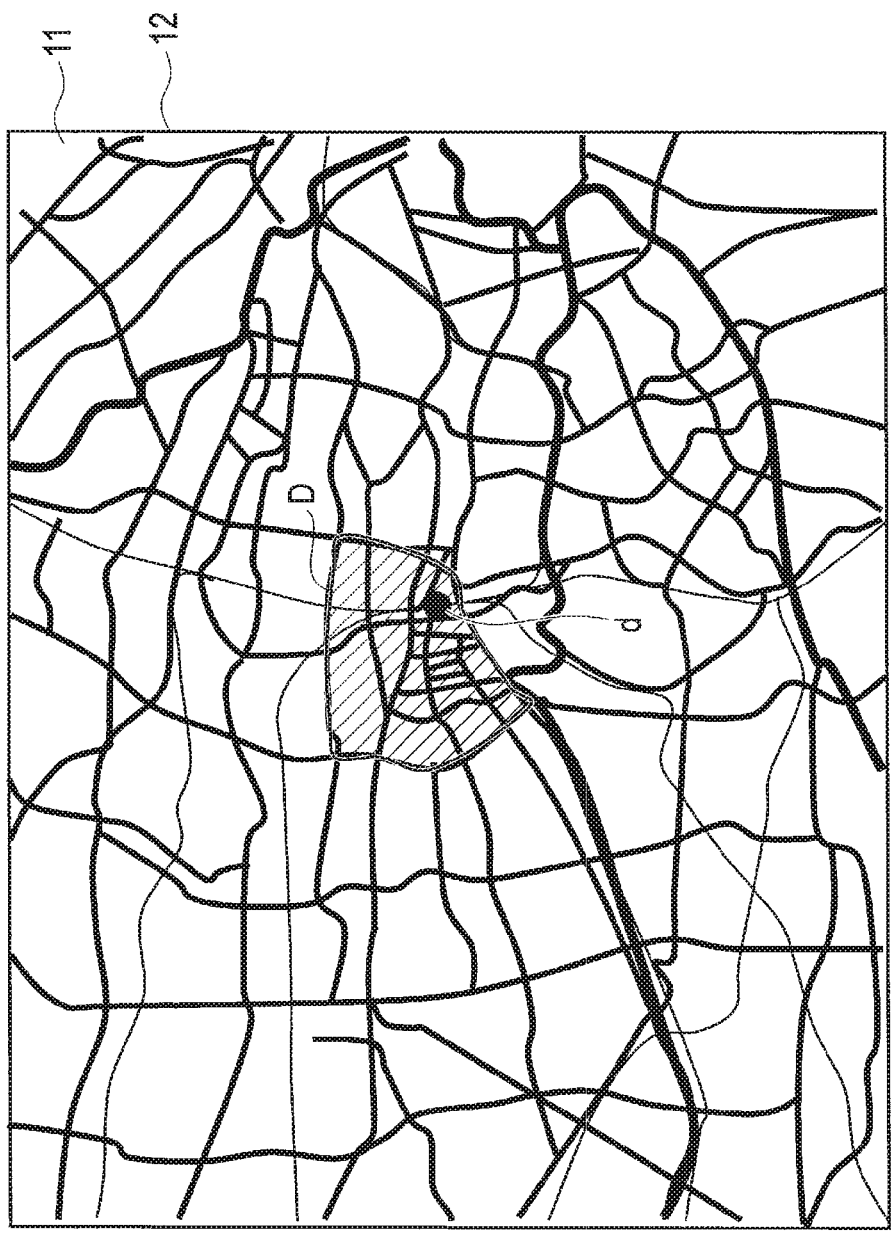
FIG. 6 is an example view showing the input unit and the presenting unit, for describing the operation of the vehicle operation device included in the autonomous vehicle according to the first embodiment of the present invention.
Figure 7:
FIG. 7 is an example view showing the input unit and the presenting unit, for describing the operation of the vehicle operation device included in the autonomous vehicle according to the first embodiment of the present invention.

The presenting unit 12 is controlled by the controller 2 to refer to the map data in the information acquisition unit 31 or the storage unit 4, and displays the map on the screen, as shown in FIG. 3, for example. When an optional point d is designated by the operation of the user performed on the input unit 11, the destination setting unit 21 allots a destination D to a circular area having a predetermined radius around the point d on the map. The destination setting unit 21 may allot the destination D to an area of an administrative section (an administrative division of municipalities or prefectures) including the point d as shown in FIG. 4, a lattice-like area including the point d as shown in FIG. 5, or an area surrounded by main roads including the point d as shown in FIG. 6. Alternatively, the destination setting unit 21 may allot the destination D to an optional area drawn by the user's operation with a finger on the map as shown in FIG. 7.

The controller 2 sets the process returning to step S101 when the destination D is not yet determined in step S102, and sets the process proceeding to step S103 when the destination D is determined in step S102.

Figure 8:
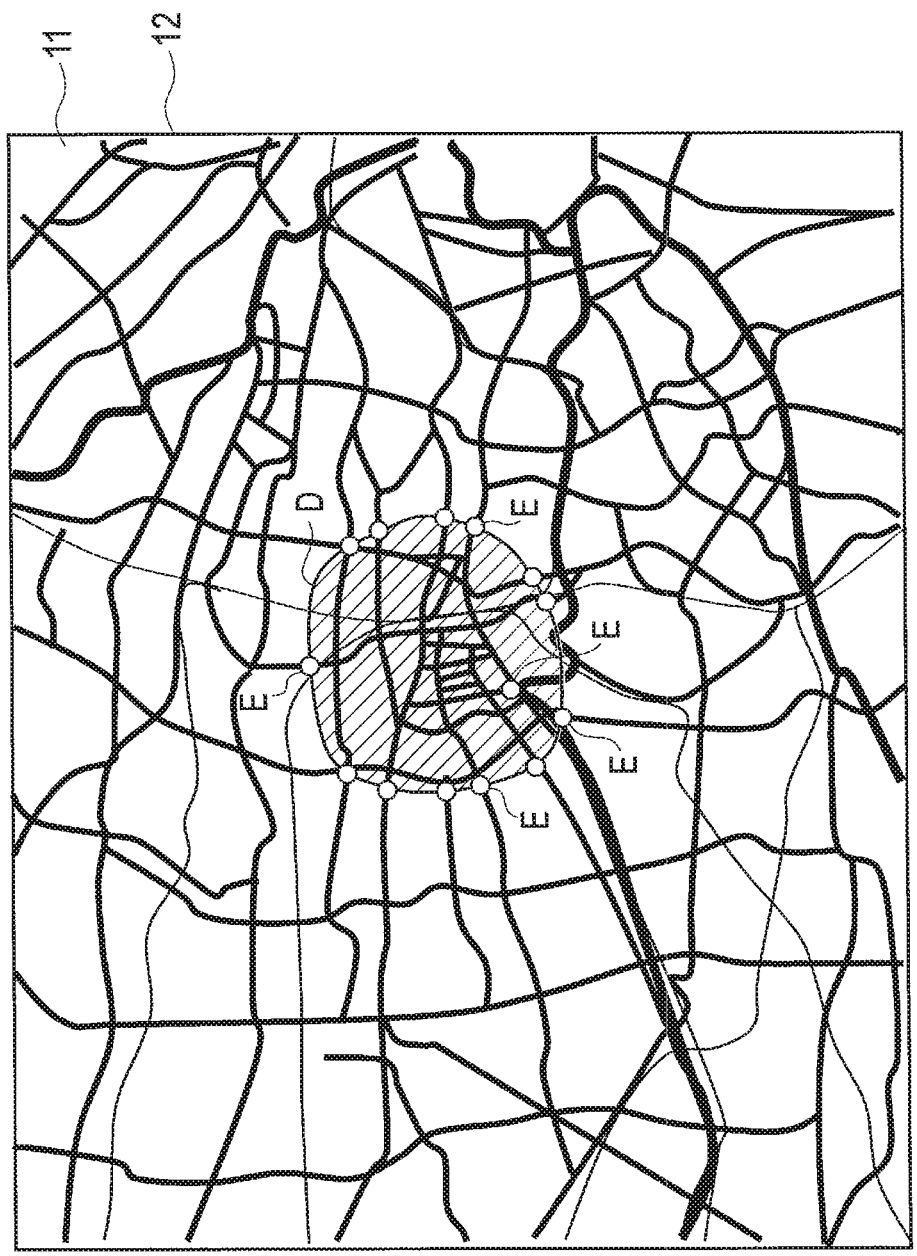
FIG. 8 is an example view showing the input unit and the presenting unit, for describing the operation of the vehicle operation device included in the autonomous vehicle according to the first embodiment of the present invention.

In step S103, as shown in FIG. 8 the route setting unit 22 searches for a plurality of points, as provisional destinations E, at which the boundary of the destination D intersects with predetermined main roads according to, for example, the current position and the route search conditions including the destination D. When the main roads are, for example, toll roads or bypass roads, the points at which the boundary of the destination D intersects with those roads cannot be designated as the provisional destinations E to start selecting other routes, and the route setting unit 22 may therefore use junctions of interchanges located inside the area of the destination D as the provisional destinations E.

In step S104, the route setting unit 22 selects and determines one provisional destination E (indicated by the black dot in FIG. 9) from the searched provisional destinations E based on the route search conditions. In particular, the route setting unit 22 determines one provisional destination based on the conditions, such as distances to the respective provisional destinations E, arrival times, fuel consumption, the number of right/left turns, and the presence or absence of toll regions.

When one provisional destination E cannot be determined in step S104, the route setting unit 22 indicates, as items selected by the user, conditions for determining the plural provisional destinations E or one provisional destination via the presenting unit 12, in step S105. The route setting unit 22 determines one provisional destination E based on an item selected by the user via the input unit 11.

Figure 9:
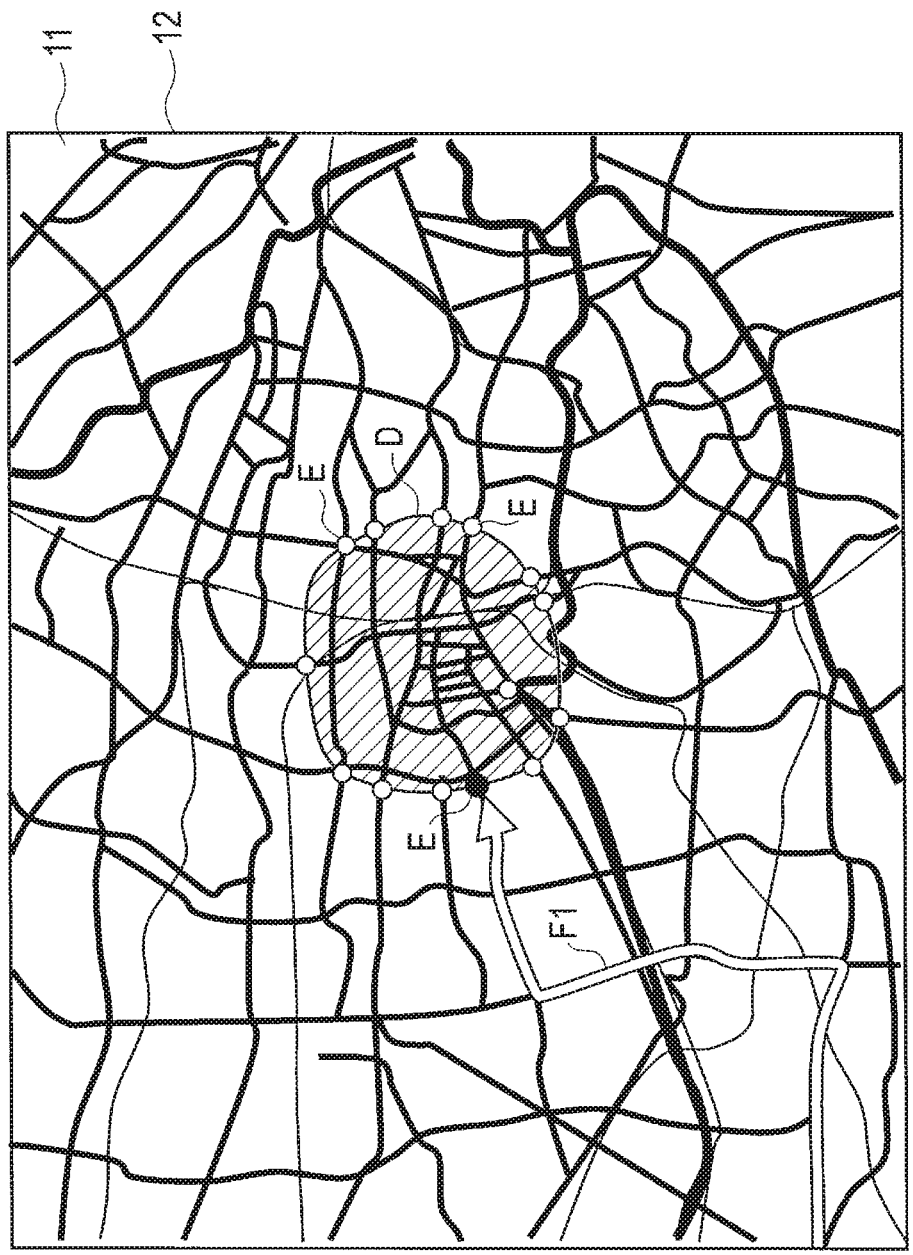
FIG. 9 is an example view showing the input unit and the presenting unit, for describing the operation of the vehicle operation device included in the autonomous vehicle according to the first embodiment of the present invention.

In step S106, the route setting unit 22 determines a driving route F1 from the current position to the provisional destination E determined in step S104 or step S105, as shown in FIG. 9.

In step S107, the controller 2 controls the driving unit 51 and the steering unit 52 so that the autonomous vehicle C drives along the driving route F1 determined in step S106. The autonomous vehicle C is controlled by the controller 2 to start autonomous driving to autonomously drive along the driving route F1 to the determined provisional destination E.

In step S108, the task estimation unit 23 estimates a suggestion task suggested to the user based on the task information obtained from the information acquisition unit 31 or the storage unit 4 during the driving of the autonomous vehicle C along the driving route F1. The suggestion task suggested by the task estimation unit 23 is a task executed inside the area of the destination D after reaching the provisional destination E. The task estimation unit 23 may suggest the suggestion task to the user based on the user information obtained by the information acquisition unit 31 from the server 6.

In step S109, the task estimation unit 23 determines whether the suggestion task is uniquely estimated. The task estimation unit 23 sets the process proceeding to step S110 when the suggestion task is not uniquely estimated but there are other options, and sets the process proceeding to step S112 when the suggested task is uniquely estimated.

Figure 10:
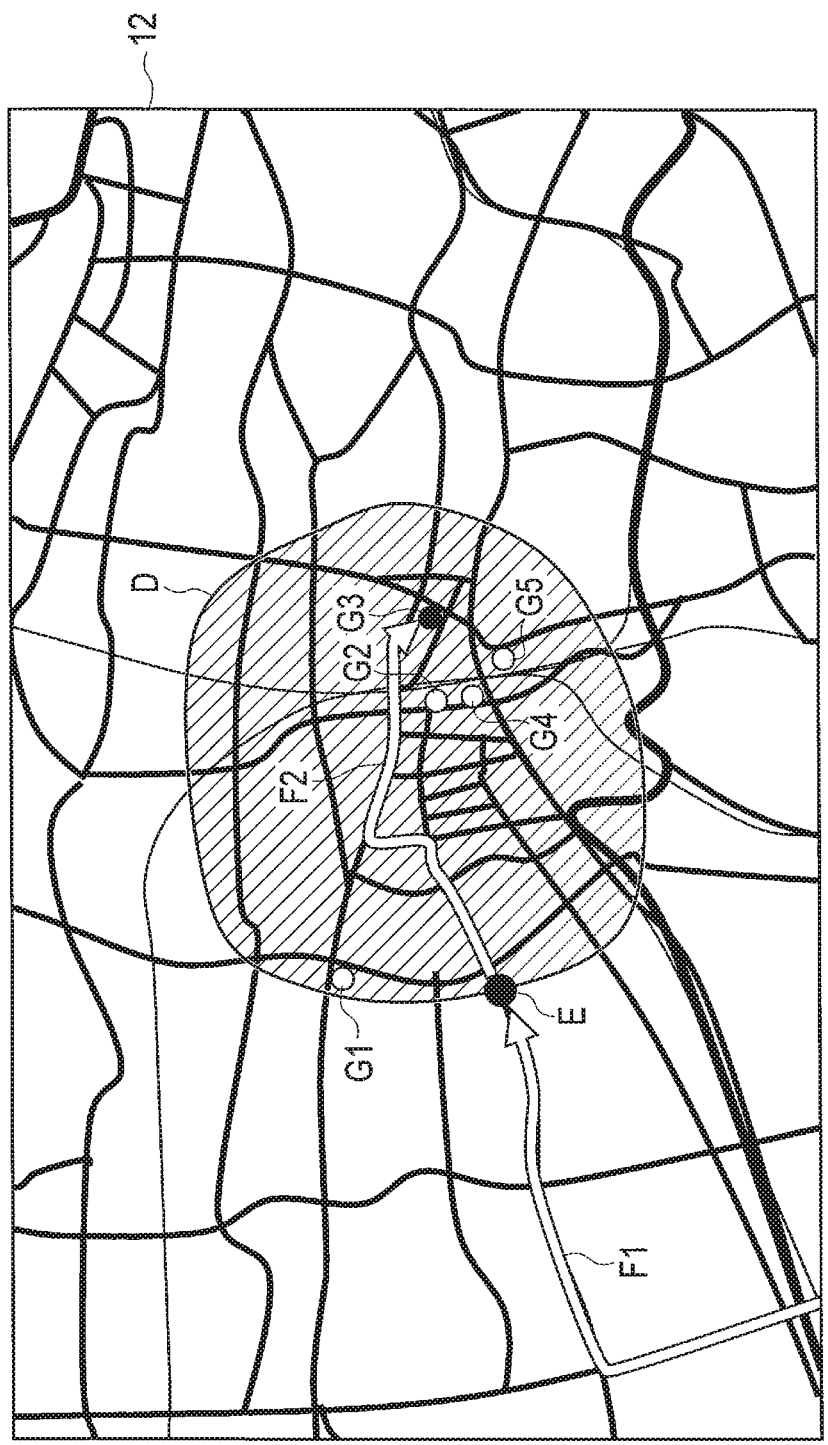
FIG. 10 is an example view showing the input unit and the presenting unit, for describing the operation of the vehicle operation device included in the autonomous vehicle according to the first embodiment of the present invention.

In step S110, the presenting unit 12 indicates, as items selected by the user, proposed sites G1 to G5 representing the plural suggestion tasks, as shown in FIG. 10, during the driving of the autonomous vehicle C along the driving route F1. In step S111, the task estimation unit 23 determines whether one suggestion task is selected from the suggestion tasks indicated in step S110, according to the user's operation performed on the input unit 11. The process proceeds to step S112 when one suggestion task is selected, and the process proceeds to step S113 when one suggestion task is not selected.

In step S112, the route setting unit 22 determines whether a final destination is determined through the steps from S109 to S111 in which the task is uniquely determined by the estimation of the task estimation unit 23 or the selection of the user. The route setting unit 22 sets the process proceeding to step S114 when the final destination is determined, and sets the process proceeding to step S118 when the final destination is not yet determined.

In step S114, the route setting unit 22 determines the proposed site representing the uniquely-determined suggestion task as a final proposed site G3. In step S115, the route setting unit 22 determines a driving route F2 from the provisional destination E at which the driving route F1 ends to the final destination G3, as shown in FIG. 10, according to the route search conditions.

In step S116, the controller 2 controls the driving unit 51 and the steering unit 52 so that the autonomous vehicle C drives along the driving routes F1 and F2. The autonomous vehicle C is controlled by the controller 2 to continue the autonomous driving to autonomously drive along the driving routes F1 and F2 so as to reach the final destination G3 after reaching the provisional destination E in the area of the destination D.

When the autonomous driving started in step S107 is continued while one suggestion task has not been selected in step S111, the route setting unit 22 determines in step S113 whether the autonomous vehicle C reaches the provisional destination E. The process returns to step S108 when the autonomous vehicle C does not yet reach the provisional destination E, and the process proceeds to step S117 when the autonomous vehicle C has reached the provisional destination E.

Figure 11:
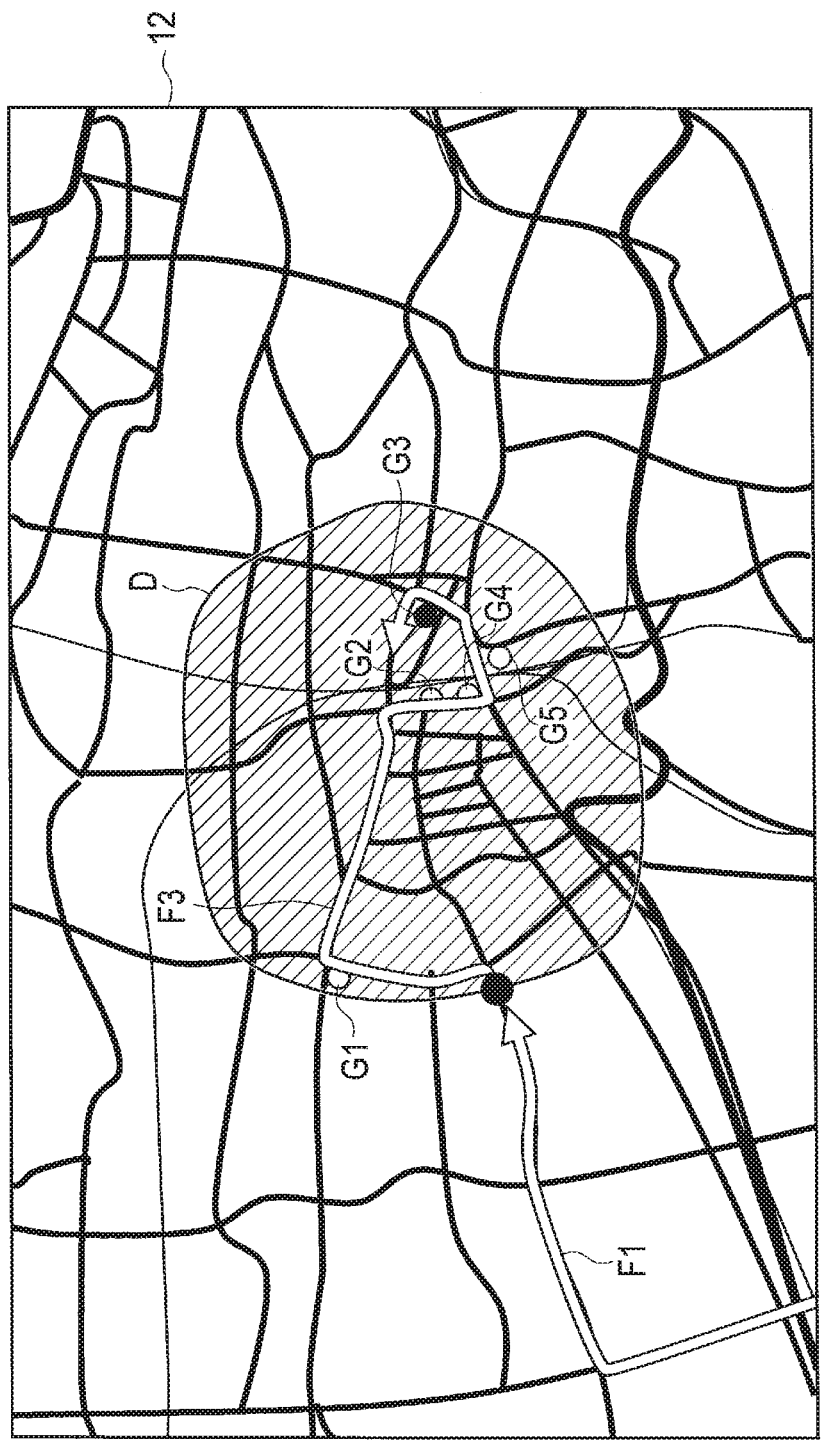
FIG. 11 is an example view showing the input unit and the presenting unit, for describing the operation of the vehicle operation device included in the autonomous vehicle according to the first embodiment of the present invention.

In step S117, the route setting unit 22 adds the suggestion tasks, as the proposed sites G1 to G5, estimated in step S108 to a traveling list. In step S118, the route setting unit 22 determines, as a driving route F3 continued from the driving route F1, a traveling route sequentially passing through the proposed sites G1 to G5 after reaching the one provisional destination E in the area of the destination D, as shown in FIG. 11.

In step S119, the controller 2 controls the driving unit 51 and the steering unit 52 so that the autonomous vehicle C drives along the driving routes F1 and F3. The autonomous vehicle C is controlled by the controller 2 to continue the autonomous driving to autonomously drive along the driving routes F1 and F3 so as to sequentially reach the proposed sites G1 to G5 after reaching the provisional destination E in the area of the destination D.

In step S120, the route setting unit 22 determines whether the autonomous vehicle C is located within a predetermined distance from the respective proposed sites G1 to G5, which are the points at which the suggestion tasks are executed. The process returns to step S119 when the autonomous vehicle C is not yet within the predetermined distance from the respective proposed sites G1 to G5, and the process proceeds to step S121 when the autonomous vehicle C is within the predetermined distance from the respective proposed sites G1 to G5.

In step S121, the notifying unit 13 notifies the user of the approach each time the autonomous vehicle C approaches the respective proposed sites G1 to G5. Simultaneously with the notification by the notifying unit 13, and together with the information about the respective proposed sites G1 to G5, the presenting unit 12 indicates items selected by the user to determine whether to set each approaching site notified by the notifying unit 13 as a final destination.

In step S122, the route setting unit 22 determines whether a single proposed site is selected, among the proposed sites G1 to G5 provided in step S121, by the user's operation performed on the input unit 11. The process proceeds to step S114 when one proposed site is selected, and the process proceeds to step S123 when one proposed site is not selected. In step S123, the autonomous vehicle C is controlled to move to the next reaching proposed sites G1 to G5 along the traveling route. The autonomous vehicle C is controlled by the controller 2 to continue the autonomous driving to autonomously drive along the driving route F3 which is the traveling route so as to sequentially reach the proposed sites G1 to G5.

The vehicle operation device 1 included in the autonomous vehicle C according to the first embodiment of the present invention regionally sets the destination D, so that the autonomous driving can be started before a specific destination is designated. Since the vehicle operation device 1 automatically provides the tasks executed in the area of the destination D, the autonomous driving to the final destination can be continued smoothly.

According to the vehicle operation device 1, the task information is obtained from the storage unit 4 or the information acquisition unit 31, so as to provide the suggestion tasks reflecting the user's intention or preference, and request the user to make a final decision with a smaller number of operation steps.

According to the vehicle operation device 1, the user information is obtained from the server 6, so as to estimate the suggestion tasks based on the information about visiting places of the user when leaving the autonomous vehicle C and user's interest.

According to the vehicle operation device 1, when the final destination can be uniquely determined, the autonomous driving toward the final destination is continued, so as to reach the final destination smoothly with a smaller number of operation steps.

Even when the final destination cannot be uniquely determined, the vehicle operation device 1 automatically generates the traveling route along which the autonomous vehicle C travels through the proposed sites, so as to continue the autonomous driving smoothly without using manual driving.

According to the vehicle operation device 1, even when the user does not select the proposed sites, the autonomous driving can be continued smoothly by autonomously moving along the traveling route without using manual driving.

According to the vehicle operation device 1, the user is notified of the approach to the proposed sites together with the information about the proposed sites when moving along the traveling route, so as to reflect the user's intention accurately.

Second Embodiment

A vehicle operation device 1A included in the autonomous vehicle C according to the second embodiment of the present invention differs from that according to the first embodiment in being applicable to the case in parking lots in rest facilities, shopping malls, and the like. The other configurations, operations, and effects in the second embodiment are substantially the same as those in the first embodiment, and overlapping descriptions are not repeated below.

Figure 12:
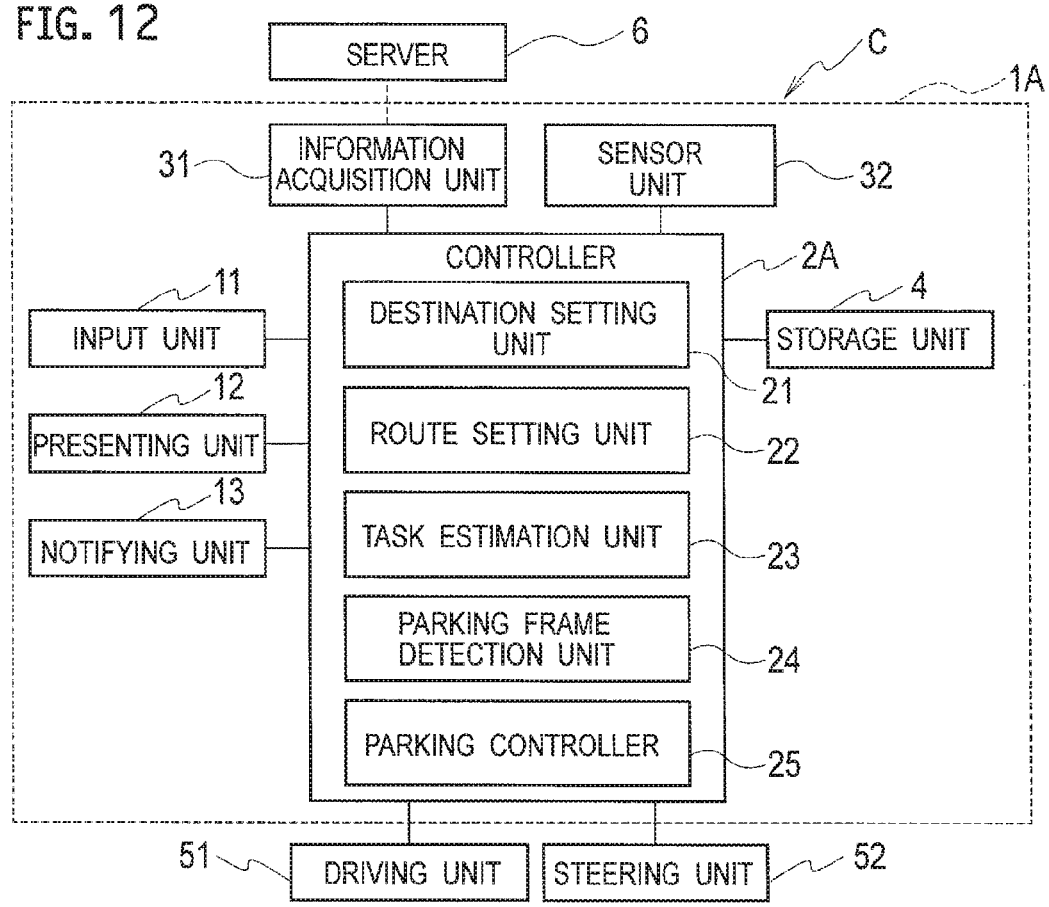
FIG. 12 is a block diagram for describing a fundamental configuration of an autonomous vehicle according to a second embodiment of the present invention.

As shown in FIG. 12, the vehicle operation device 1A includes a controller 2A including, in addition to the destination setting unit 21, the route setting unit 22, and the task estimation unit 23, a parking frame detection unit 24 for detecting parking frames, and a parking controller for controlling the autonomous vehicle C to park in a parking frame detected.

The parking frame detection unit 24 detects a parking frame located around the autonomous vehicle C in a parking lot so that the autonomous vehicle C can be parked. The parking frame detection unit 24 detects an available parking frame while detecting other vehicles, obstacles, and other parking frames by processing images imaged by, for example, the sensor unit 32 serving as a camera. The parking controller 25 controls the autonomous vehicle C to park in the available parking frame detected by the parking frame detection unit 24 while detecting other vehicles, obstacles, and other parking frames by processing the images imaged by the sensor unit 32.

Figure 13:
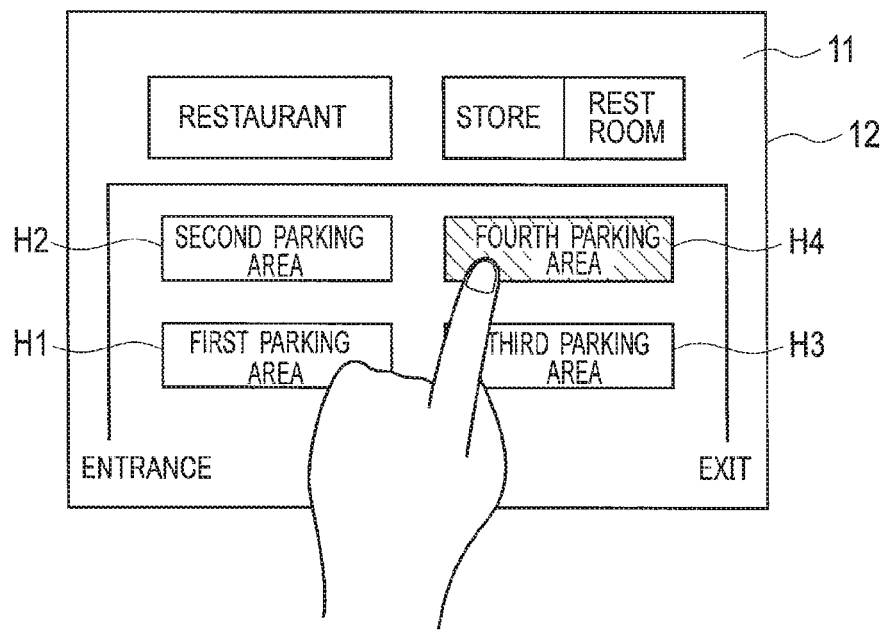
FIG. 13 is an example view showing an input unit and a presenting unit, for describing the operation of a vehicle operation device included in the autonomous vehicle according to the second embodiment of the present invention.

As shown in FIG. 13, the presenting unit 12 provides the user with predetermined sections indicated by items selected by the user in a layout of a parking lot according to map data obtained from the storage unit 4 or the information acquisition unit 31. As shown in the example of FIG. 13, the presenting unit 12 indicates first to fourth parking areas as parking sections indicated by items H1 to H4 displayed on the screen showing the layout of the parking lot.

Figure 14:
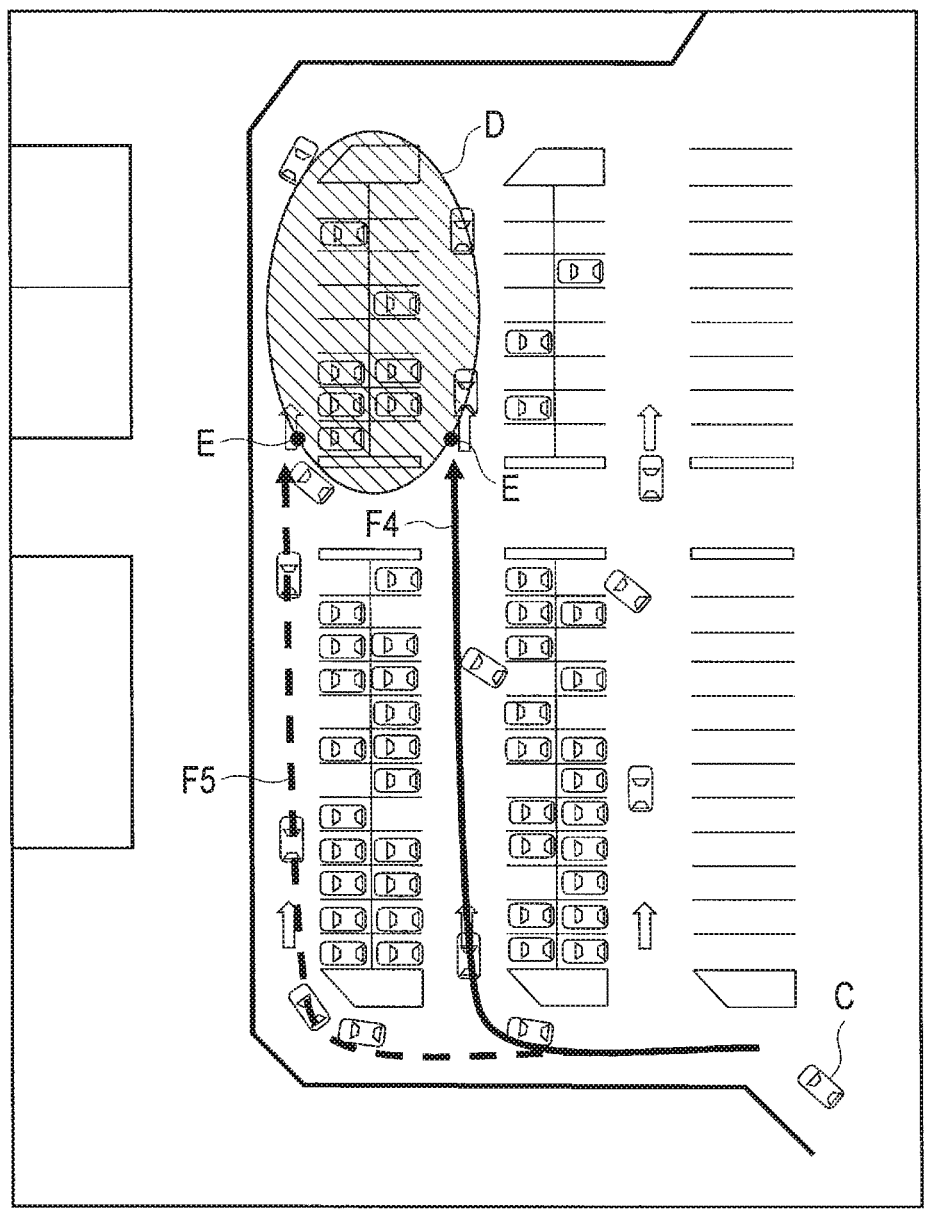
FIG. 14 is a top view of the autonomous vehicle in a parking lot, for describing the operation of the vehicle operation device included in the autonomous vehicle according to the second embodiment of the present invention.

As shown in FIG. 14, for example, the destination setting unit 21 sets the fourth parking area as the destination D according to the user's operation performed on the input unit 11. The route setting unit 22 allots provisional destinations E to points at which the boundary of the area of the destination D intersects with passages through which vehicles pass in the parking lot. For example, the route setting unit 22 obtains information of a time zone or parking conditions in the parking lot from the information acquisition unit 31, and automatically chooses a driving route F4 with a lower possibility of being crowded from the driving routes F4 and F5 that are the routes to the plural provisional destinations E.

Figure 15:
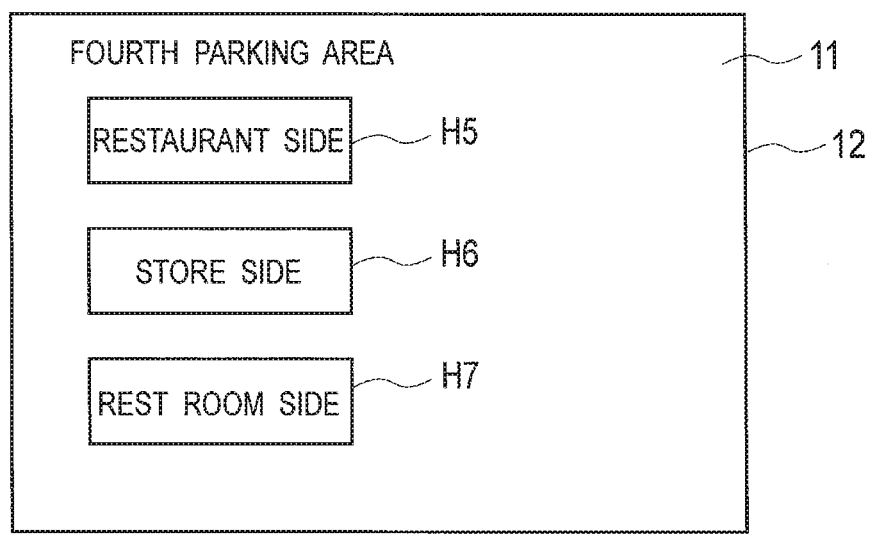
FIG. 15 is an example view showing the input unit and the presenting unit, for describing the operation of the vehicle operation device included in the autonomous vehicle according to the second embodiment of the present invention.

For example, when the autonomous vehicle C is moving along the driving route F4, the presenting unit 12 indicates items H5 to H7 selected by the user for determining where the autonomous vehicle C is parked, the restaurant side, the store side, or the rest room side, by referring to the layout shown in FIG. 15. A restaurant, a store, and a rest room are aligned in this order from the entrance to the exit of the parking lot.

When the user does not select the items H5 to H7, the route setting unit 22 may choose the longest passage in the parking lot as the driving route. The parking frame detection unit 24 detects an available parking frame while moving along the driving route. The presenting unit 12 indicates an item operated by the user for determining whether to park in the parking frame detected by the parking frame detection unit 24. The route setting unit 22 changes the driving route according to the user's determination to park in the parking frame. The parking controller 25 then controls the autonomous vehicle C to park in the detected parking frame.

Figure 16:
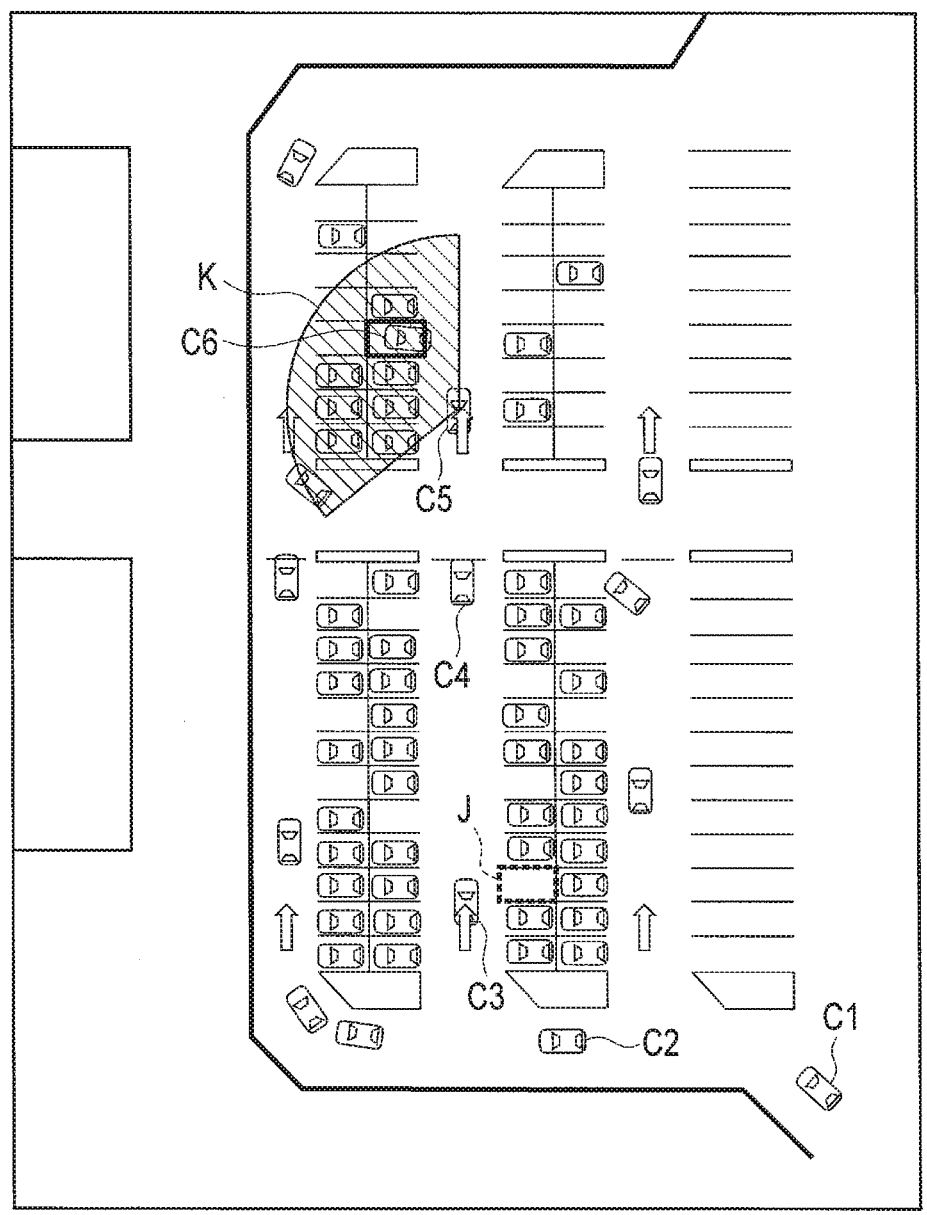
FIG. 16 is a top view of the autonomous vehicle in a parking lot, for describing the operation of the vehicle operation device included in the autonomous vehicle according to the second embodiment of the present invention.
Figure 17:
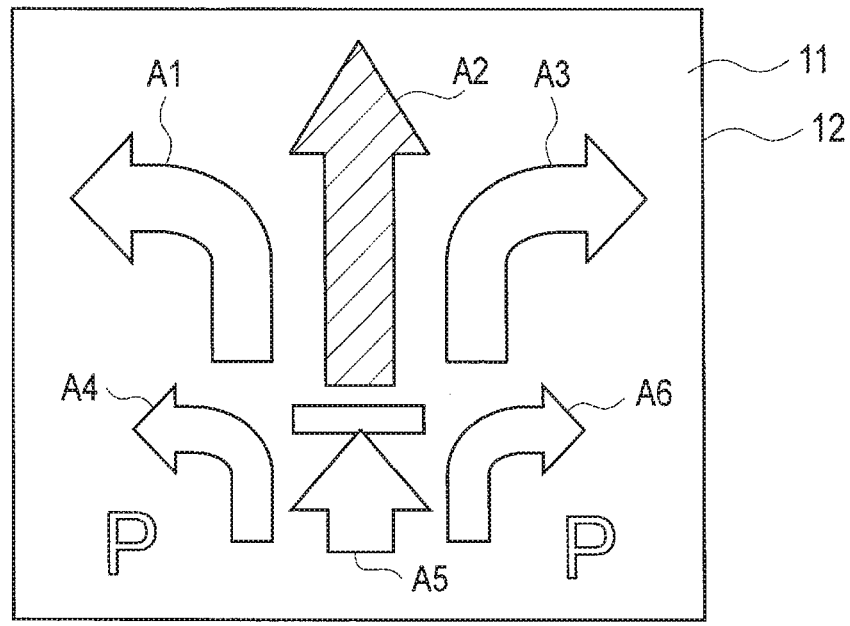
FIG. 17 is an example view showing the input unit and the presenting unit, for describing the operation of the vehicle operation device included in the autonomous vehicle according to the second embodiment of the present invention.

For example, when the autonomous vehicle C is located in position C1 as shown in FIG. 16, the presenting unit 12 provides the user with six items indicated by the arrows A1 to A6, as shown in FIG. 17. The arrows A1 to A6 denote a left turn, a forward movement, a right turn, parking in a left parking frame, a stop, and parking in a right parking frame. In the example shown in FIG. 17, the arrow A2 entirely hatched denotes that the autonomous vehicle C located in the position C1 makes a forward movement at the next junction.

Figure 18:
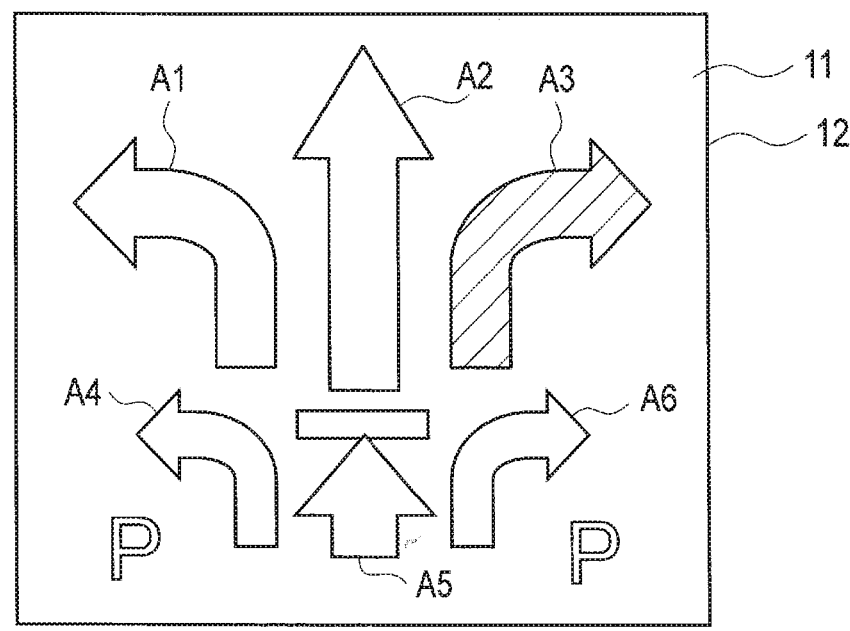
FIG. 18 is an example view showing the input unit and the presenting unit, for describing the operation of the vehicle operation device included in the autonomous vehicle according to the second embodiment of the present invention.

When the autonomous vehicle C is located in position C2, the presenting unit 12 indicates the arrow A3 denoting that the right turn is made at the next junction, as shown in FIG. 18. The right turn is automatically determined by the route setting unit 22 according to, for example, the information of a time zone or parking conditions in the parking lot. The right/left turns or the forward movement may be made depending on the user's operation performed on the items corresponding to the arrows A1 to A6 displayed on the input unit 11.

Figure 19:
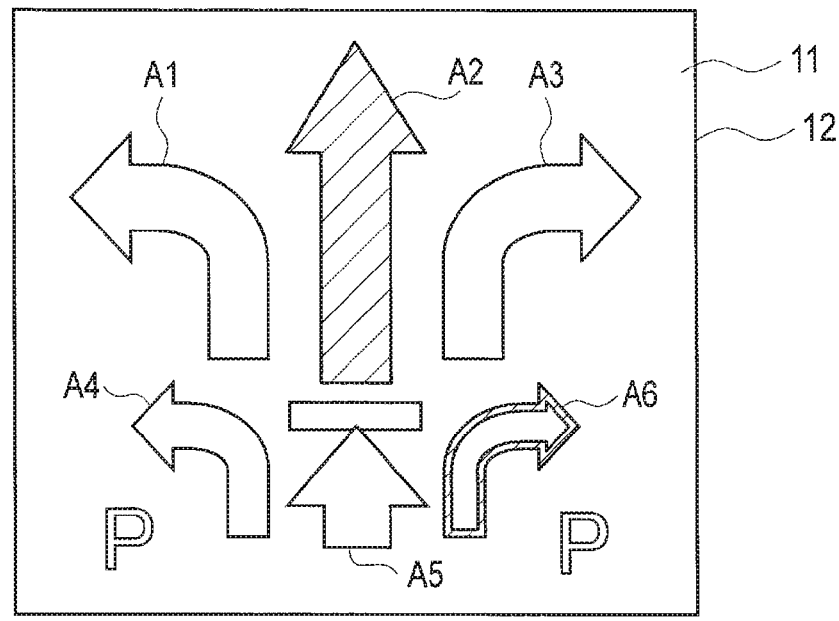
FIG. 19 is an example view showing the input unit and the presenting unit, for describing the operation of the vehicle operation device included in the autonomous vehicle according to the second embodiment of the present invention.

The parking frame detection unit 24 detects available parking frame J on the right side of the autonomous vehicle C when the autonomous vehicle C is located in position C3. The presenting unit 12 indicates the arrow A6 with only the peripheral edge hatched, as shown in FIG. 19, so as to differentiate it from the arrow A2 denoting the action to be performed. The indication of the arrow A6 denotes that the parking controller 25 controls the autonomous vehicle C to park in the parking frame J detected on the right side of the autonomous vehicle C when the item displayed on the input unit 11 corresponding to the arrow A6 is operated.

Figure 20:
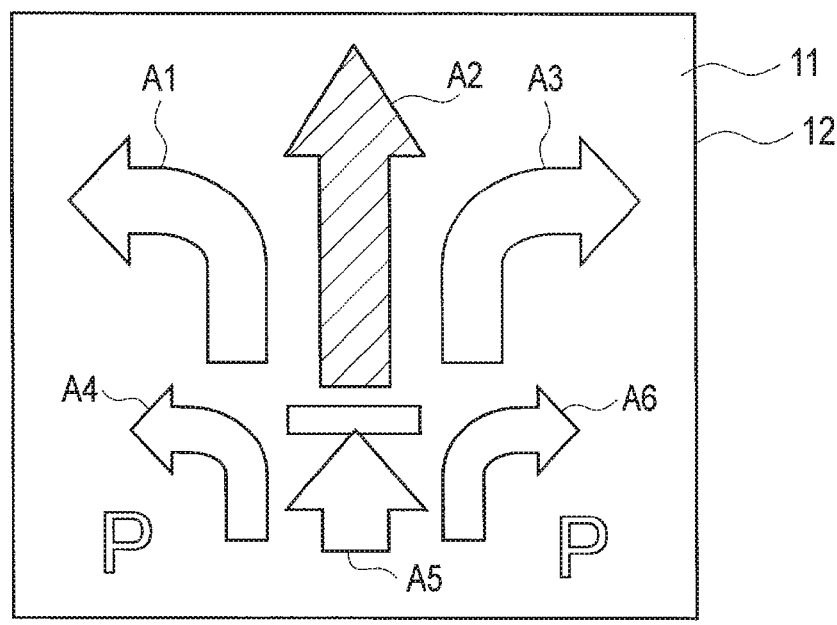
FIG. 20 is an example view showing the input unit and the presenting unit, for describing the operation of the vehicle operation device included in the autonomous vehicle according to the second embodiment of the present invention.
Figure 21:
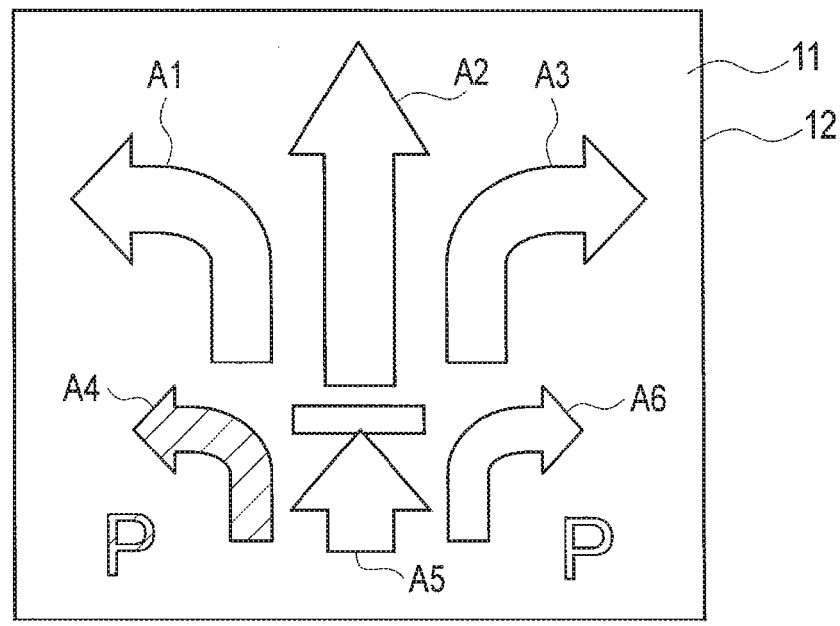
FIG. 21 is an example view showing the input unit and the presenting unit, for describing the operation of the vehicle operation device included in the autonomous vehicle according to the second embodiment of the present invention.

The autonomous vehicle C, when located in position C4, detects an intersecting passage by referring to the layout of the parking lot, so as to automatically stop at the intersection. The presenting unit 12 then indicates the arrow A2 denoting the following forward movement, as shown in FIG. 20.

When the autonomous vehicle C is located in position C5, the parking frame detection unit 24 detects an available parking frame within the field of view K on the front left side of the sensor unit 32. The presenting unit 12 then indicates the arrow A4 denoting that the autonomous vehicle C is parked in a next-detected available parking frame on the left side.

The parking controller 25 controls the driving unit 51 and the steering unit 52, while the sensor unit 32 detects other vehicles, obstacles, and other parking frames, so as to park the autonomous vehicle C in the available parking frame detected by the parking frame detection unit 24. The autonomous vehicle C is controlled by the parking controller 25 to autonomously park in the available parking frame safely at position C6.

When an available parking frame cannot be detected in the proposed site, the route setting unit 22 may set a traveling route in the parking lot, or the presenting unit 12 may again display the first to fourth parking areas as proposed destinations.

Figure 22:
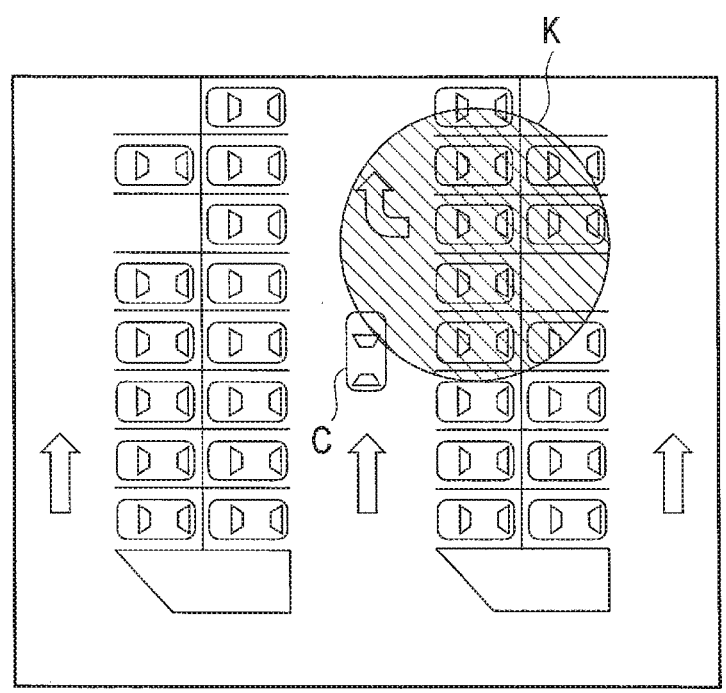
FIG. 22 is a top view of the autonomous vehicle in a parking lot, for describing the operation of the vehicle operation device included in the autonomous vehicle according to the second embodiment of the present invention.
Figure 23:
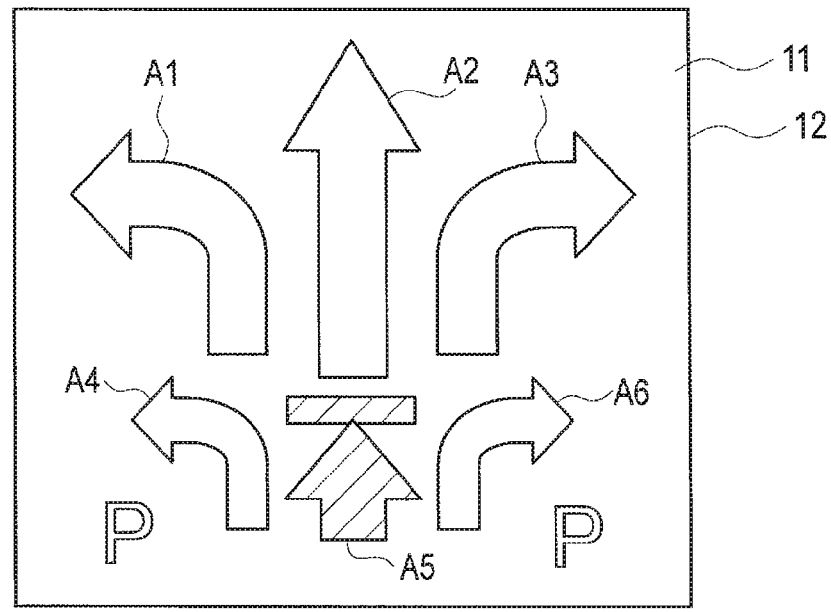
FIG. 23 is an example view showing the input unit and the presenting unit, for describing the operation of the vehicle operation device included in the autonomous vehicle according to the second embodiment of the present invention.

As shown in FIG. 22, when the user finds a parking frame from which the other vehicle is leaving on the front right side of the autonomous vehicle C outside the area of the destination, the autonomous vehicle C may be parked in the found parking frame by the user's operation. The input unit 11 inputs a command to stop the autonomous vehicle C into the controller 2A by the user's operation performed on the item corresponding to the arrow A5 indicated on the input unit 11, as shown in FIG. 23. The controller 2 controls the autonomous vehicle C to stop according to the user's operation.

Figure 24:
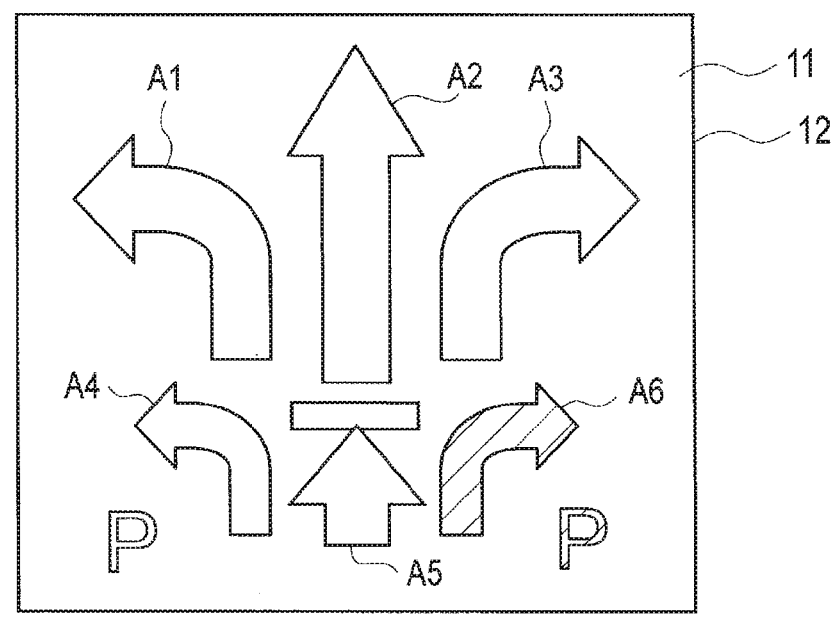
FIG. 24 is an example view showing the input unit and the presenting unit, for describing the operation of the vehicle operation device included in the autonomous vehicle according to the second embodiment of the present invention.

After the other vehicle comes out of the parking frame, the parking frame detection unit 24 detects the parking frame of which the other vehicle comes out as an available parking frame. The input unit 11 then inputs a command to park in the parking frame on the right side the controller 2A by the user's operation performed on the item corresponding to the arrow A6 indicated on the input unit 11, as shown in FIG. 24. The parking controller 25 controls the autonomous vehicle C to park in the available parking frame according to the user's operation.

Figure 25:
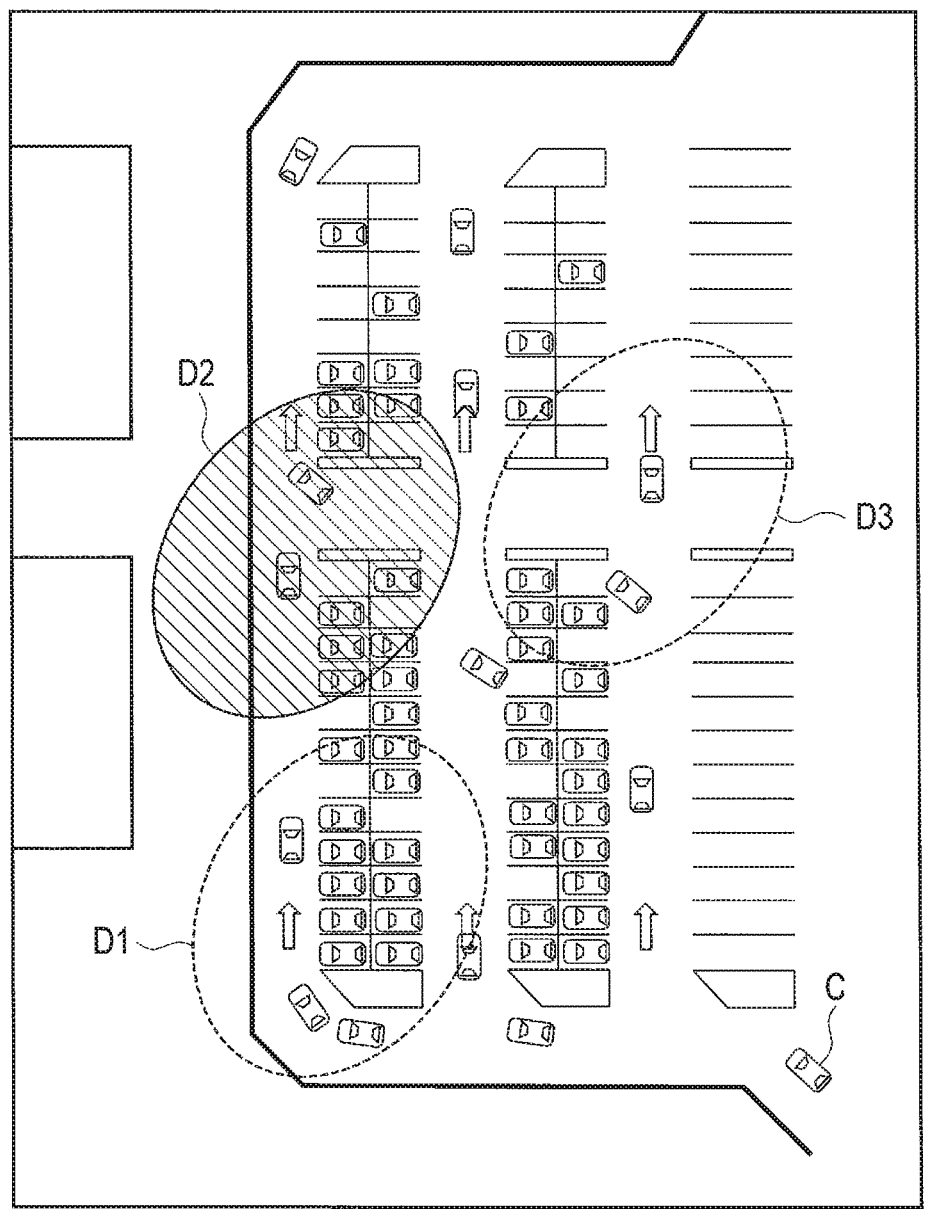
FIG. 25 is a top view of the autonomous vehicle in a parking lot, for describing the operation of the vehicle operation device included in the autonomous vehicle according to the second embodiment of the present invention.
Figure 26:
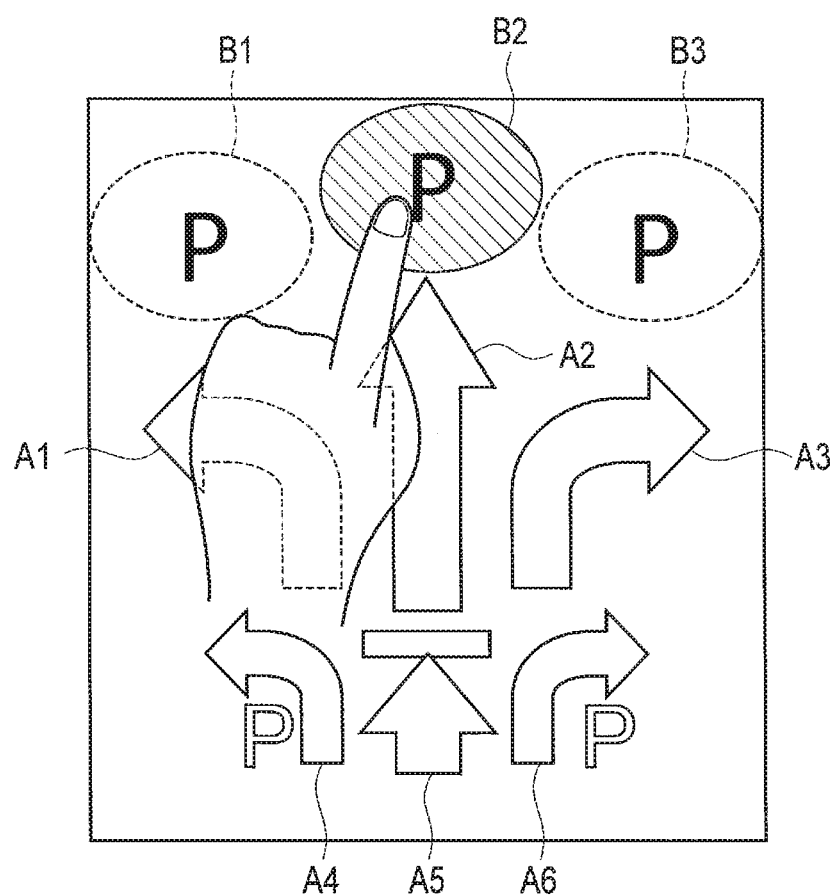
FIG. 26 is an example view showing the input unit and the presenting unit, for describing the operation of the vehicle operation device included in the autonomous vehicle according to the second embodiment of the present invention.

When the layout of the parking lot cannot be obtained, the destination setting unit 21 may determine, as destinations, sections defined depending on the front, right, and left directions and distances based on the position of the autonomous vehicle C, as shown in FIG. 25. The presenting unit 12 provides the user with regions B1 to B3, as shown in FIG. 26, as the sections defined depending on the front, right, and left directions and distances. The destination setting unit 21 determines the region B2 selected by the user's operation as destination D2 (refer to FIG. 25). The route setting unit 22 successively generates driving routes to the destination D2 according to the surrounding information detected by the sensor unit 32.

The vehicle operation device 1A included in the autonomous vehicle C according to the second embodiment of the present invention regionally sets the destination D, so that the autonomous driving can be started before a specific destination is designated. Since the vehicle operation device 1A automatically provides the tasks executed in the area of the destination D, the autonomous driving to the final destination can be continued smoothly.

According to the vehicle operation device 1A, an optional region in the parking lot is determined as a destination, so that the autonomous vehicle C can move to park in a parking area not detected from the current position. When the destination is determined by the user's operation, the vehicle operation device 1A can park the autonomous vehicle C without the use of a system for managing vacant conditions in the parking lot.

According to the vehicle operation device 1A, the operation control can be interrupted while moving along the determined driving route, so as to immediately park the autonomous vehicle C in an optional parking frame in a crowded parking lot.

According to the vehicle operation device 1A, a periphery of a target facility or a usually-available parking zone can be selected depending on the user's intention by referring to the layout of the parking lot or the facility.

The vehicle operation device 1A can refer to the information about private parking lots or parking lots at the newest facilities by externally acquiring layouts thereof, so as to reflect the user's intention more accurately.

According to the vehicle operation device 1A, even when the user does not designate a destination, the autonomous vehicle C autonomously moves along the longest driving route, so as to increase the possibility of finding a parking space in the parking lot.

According to the vehicle operation device 1A, even when a layout cannot be obtained, a destination is set to a roughly-determined area, and the autonomous vehicle C autonomously moves along a route thereto, so as to autonomously park in a parking space while keeping the autonomous driving.

Other Embodiments

While the present invention has been described above by reference to the embodiments, the present invention is not intended to be limited to the statements and drawings composing part of this disclosure. Various alternative embodiments, examples, and practical techniques will be apparent to those skilled in the art from this disclosure.

For example, in the embodiments described above, the input unit 11 may be a voice input device that receives the user's operations by voice.

The present invention, of course, includes various embodiments not described in this description, such as configurations including the first and second embodiments mutually applied. Therefore, the scope of the present invention is defined only by the appropriate features according to the claims in view of the explanations made above.

According to the present invention, a vehicle operation device can be provided capable of starting autonomous driving before designating a specific destination by regionally setting a destination, and capable of smoothly continuing the autonomous driving to a final destination by providing tasks executed in the area of the destination.

REFERENCE SIGNS LIST

C AUTONOMOUS VEHICLE
D DESTINATION
E PROVISIONAL DESTINATION
F DRIVING ROUTE
1, 1A VEHICLE OPERATION DEVICE
12 PRESENTING UNIT
13 NOTIFYING UNIT
21 DESTINATION SETTING UNIT
22 ROUTE SETTING UNIT
23 TASK ESTIMATION UNIT
24 PARKING FRAME DETECTION UNIT
25 PARKING CONTROLLER
31 INFORMATION ACQUISITION UNIT
32 SENSOR UNIT

The invention claimed is:

1. A vehicle operation device used in an autonomous vehicle autonomously controlled to drive along a determined driving route, the vehicle operation device comprising:
   a destination setting circuit configured to set a destination to a wide area for determining the driving route;
   a route setting circuit configured to allot a provisional destination on a boundary of the area of the destination according to route search conditions including a current position and the destination, so as to determine the driving route passing through the provisional destination; and
   a presenting circuit configured to provide a user with a task indicated by an item operated by the user while the autonomous vehicle is moving along the driving route toward the provisional destination, so that the task is executed in the area of the destination after reaching the provisional destination.

2. The vehicle operation device according to claim 1, further comprising a task estimation circuit configured to estimate a task suggested to the user according to at least one of a history of tasks selected by the user, a time zone in which the task is executed, a history of driving toward the destination, and facility information in the area of the destination,
   wherein the presenting circuit indicates an item operated by the user denoting the task estimated by the task estimation circuit.

3. The vehicle operation device according to claim 1, further comprising:
   an information acquisition circuit configured to acquire user information via a network from a server that holds the user information including at least one of registration information of the user, a submission history, and an activity history; and
   a task estimation circuit configured to estimate a task suggested to the user according to the user information acquired by the information acquisition circuit,
   wherein the presenting circuit indicates an item operated by the user denoting the task estimated by the task estimation circuit.

4. The vehicle operation device according to claim 2, wherein, when the task is uniquely estimated, the route setting circuit determines the driving route such that the task is executed after reaching the area of the destination.

5. The vehicle operation device according to claim 2, wherein, when the task is not uniquely estimated but there are other tasks, the route setting circuit determines a traveling route as the driving route along which the tasks are sequentially executed after reaching the area of the destination.

6. The vehicle operation device according to claim 1, wherein, when the user does not select any task, the route setting circuit determines a traveling route as the driving route along which the tasks are sequentially executed after reaching the area of the destination.

7. The vehicle operation device according to claim 5, further comprising a notifying circuit configured to notify the user of approach to places at which the tasks are executed while the autonomous vehicle drives along the driving route, wherein the presenting circuit provides the user with each task indicated by an item operated by the user each time the notifying circuit notifies the user of the approach to the place at which the task is executed.

8. The vehicle operation device according to claim 1, wherein the presenting circuit indicates an item operated by the user denoting a task for determining a final destination executed in the area of the destination after reaching the provisional destination.

9. A vehicle operation device used in an autonomous vehicle autonomously controlled to drive along a determined driving route, the vehicle operation device comprising:

a destination setting circuit configured to set an area that is parking sections in a parking lot as a destination for determining the driving route to an optional area in the parking lot;

a route setting circuit configured to determine the driving route to the area according to route search conditions including a current position and the destination; and a parking controlling circuit configured to control the autonomous vehicle to park at one of the parking sections in the area.

10. The vehicle operation device according to claim 9, further comprising a parking frame detection circuit configured to detect an available parking frame located around the autonomous vehicle so that the autonomous vehicle can be parked therein, wherein the parking frame detection circuit detects the available parking frame after reaching the area, and the parking controlling unit circuit controls the autonomous vehicle to park in the available parking frame in the area.

11. The vehicle operation device according to claim 10, further comprising a presenting circuit configured to provide the user with a task indicated by an item operated by the user while the autonomous vehicle is moving along the driving route toward the area, so that the task is executed in the area after reaching the area, wherein the parking frame detection circuit detects the available parking frame around the autonomous vehicle while the autonomous vehicle is moving toward the destination in the parking lot, the presenting circuit provides the user with an item operated when the user determines whether to park the autonomous vehicle in the available parking frame outside the area, the route setting circuit changes the driving route when the user operates the item denoting that the autonomous vehicle is parked in the available parking frame, and the parking controlling circuit controls the autonomous vehicle to park in the available parking frame outside the area.

12. The vehicle operation device according to claim 10, further comprising a presenting circuit configured to provide the user with a task indicated by an item operated by the user while the autonomous vehicle is moving along the driving route toward the area, so that the task is executed in the area after reaching the area, wherein the presenting circuit provides the user with a section indicated by an item operated by the user and preliminarily shown in a layout of the parking lot, and the destination setting circuit sets the item operated by the user as the destination.

13. The vehicle operation device according to claim 12, wherein the layout is externally obtained via communication.

14. The vehicle operation device according to claim 10, further comprising a presenting circuit configured to provide the user with a task indicated by an item operated by the user while the autonomous vehicle is moving along the driving route toward the area, so that the task is executed in the area after reaching the area, wherein the route setting circuit determines, as the driving route, a route of a longest passage in the parking lot when the user does not select any item, the parking frame detection circuit detects the available parking frame around the autonomous vehicle while the autonomous vehicle is moving along the passage in the parking lot, the presenting circuit provides the user with an item operated when the user determines whether to park the autonomous vehicle in the available parking frame, the route setting circuit changes the driving route when the user operates the item denoting that the autonomous vehicle is parked in the available parking frame, and the parking controlling circuit controls the autonomous vehicle to park in the available parking frame outside the area.

15. The vehicle operation device according to claim 10, further comprising:

a presenting circuit configured to provide the user with a task indicated by an item operated by the user while the autonomous vehicle is moving along the driving route toward the area, so that the task is executed in the area after reaching the area; and a sensor configured to detect surrounding information of the autonomous vehicle, wherein the presenting circuit indicates a region operated by the user as a section defined depending on front, right, and left directions and distances based on a position of the autonomous vehicle, the destination setting circuit determines the region operated by the user as the destination, and the route setting circuit successively generates driving routes according to the surrounding information detected by the sensor.

16. A vehicle operation method for an autonomous vehicle autonomously controlled to drive along a determined driving route, the vehicle operation method comprising the steps of:

setting a destination to a wide area for determining the driving route;

allotting a provisional destination on a boundary of the area of the destination according to route search conditions including a current position and the destination, so as to determine the driving route passing through the provisional destination; and providing a user with a task indicated by an item operated by the user while the autonomous vehicle is moving along the driving route toward the provisional destination, so that the task is executed in the area of the destination after reaching the provisional destination.

17. A vehicle operation method for an autonomous vehicle autonomously controlled to drive along a determined driving route, the vehicle operation method comprising the steps of:

setting an area that is parking sections in a parking lot as a destination for determining the driving route;

determining the driving route to the area according to route search conditions including a current position and the destination; and controlling the autonomous vehicle to park at one of the parking sections in the area.

\* \* \* \* \*